(12) United States Patent
Luo

(10) Patent No.: US 8,332,853 B2
(45) Date of Patent: Dec. 11, 2012

(54) TASK SCHEDULING OF FIBER-OPTIC TRANSCEIVER FIRMWARE

(75) Inventor: Jun Luo, Singapore (SG)

(73) Assignee: Finisar Corporation, Sunnyvale, CA (US)

( * ) Notice: Subject to any disclaimer, the term of this patent is extended or adjusted under 35 U.S.C. 154(b) by 1118 days.

(21) Appl. No.: 12/185,039

(22) Filed: Aug. 1, 2008

(65) Prior Publication Data

US 2009/0083755 A1 Mar. 26, 2009

Related U.S. Application Data

(60) Provisional application No. 60/953,754, filed on Aug. 3, 2007.

(51) Int. Cl.
*G06F 9/46* (2006.01)
*H04B 10/08* (2006.01)
(52) U.S. Cl. ........... 718/102; 718/100; 718/108; 398/22
(58) Field of Classification Search .................... None
See application file for complete search history.

(56) References Cited

U.S. PATENT DOCUMENTS

| | | | |
|---|---|---|---|
| 2003/0005417 A1* | 1/2003 | Gard et al. | 717/135 |
| 2004/0047635 A1 | 3/2004 | Aronson et al. | |
| 2004/0088704 A1* | 5/2004 | Owen et al. | 718/100 |
| 2004/0136721 A1 | 7/2004 | Giaretta et al. | |
| 2006/0070078 A1* | 3/2006 | Dweck et al. | 718/104 |
| 2006/0147162 A1 | 7/2006 | Ekkizogloy et al. | |
| 2006/0147178 A1 | 7/2006 | Ekkizogloy et al. | |
| 2007/0019201 A1 | 1/2007 | Waagaard et al. | |
| 2007/0143761 A1* | 6/2007 | Deng | 718/103 |

* cited by examiner

*Primary Examiner* — Kenneth Tang
(74) *Attorney, Agent, or Firm* — Maschoff Gilmore & Israelsen

(57) ABSTRACT

Systems and methods for optimizing the task scheduling efficiency of firmware and/or software associated with optoelectronic transceiver devices. In one example, a scheduling module executes microcode that schedules tasks based on the operational parameters. The scheduling module compares operational parameters with their last known values and then flags necessary tasks to be initiated. The scheduling module flags only those tasks that rely on a particular operational parameter and only if the operational parameter has changed in value since the most recent time that it has been measured. Specifically, the scheduling module identifies leading tasks and dependent tasks and flags tasks only if data that relies on the operating parameter has changed since a previous task scheduling determination.

15 Claims, 5 Drawing Sheets

TASK SCHEDULING OF FIBER-OPTIC TRANSCEIVER FIRMWARE

CROSS-REFERENCE TO RELATED APPLICATIONS

This application claims the benefit of and priority to U.S. Provisional Application No. 60/953,754, filed Aug. 3, 2007, which application is incorporated herein by reference in its entirety.

BACKGROUND OF THE INVENTION

1. The Field of the Invention

The present invention relates generally to optoelectronic communication devices. More specifically, the present invention relates to task scheduling efficiency of firmware and/or software associated with optoelectronic transceiver devices.

2. The Relevant Technology

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications in networks of all sizes.

Typically, data transmission in such networks is implemented by way of an optical transmitter (also referred to as an electro-optic transducer), such as a laser or Light Emitting Diode (LED). The electro-optic transducer emits light when current is passed there through, the intensity of the emitted light being a function of the current magnitude through the transducer. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

The characteristics of an optical transmitter and receiver are changed over operational conditions like temperature and voltage. For example, the threshold current and slope efficiency of a laser diode change over temperature. To ensure the quality and integrity of data transmission, various measurement and compensation circuits are employed by an optical transceiver to compensate for these changes. Furthermore, an optical transceiver with digital diagnostics features need to communicate with hosting equipment in a protocol defined by multi source agreement ("MSA") specification, e.g. small form-factor pluggable (SFP) transceiver MSA and 10-gigabit small form-factor pluggable (XFP) transceiver MSA.

The measurement, compensation, diagnostics, communication, and potentially other functions are typically controlled and/or implemented in part by a microcontroller and its associated embedded software (hereinafter referred to as firmware). The firmware that is typically designed in a modular form for ease of maintenance contains multiple firmware modules with each handling one of the above functions. For example, the firmware may contain an acquisition module for sequencing an analog-to-digital converter (ADC) to measure multiple analog input signals one by one. It may also have a calibration module that adopts certain algorithms to eliminate errors of various component parameters, e.g. temperature coefficient of a thermistor sensing the operational temperature. The firmware may further contain a logic evaluation module that assesses the calibrated parameters in real time and triggers a control action upon crossing preset alarm and warning thresholds, or simply leaves the calibrated parameters and alarm and warning flags to a communication module for queries initiated by host equipment. All these firmware modules are executed by a microcontroller or the like which typically contains only one or two CPUs due to the restrictions of component cost. Planning of the use of CPUs on processing each firmware module, which is referred to hereinafter as "task scheduling", is essential to ensure all modules are timely processed. For the convenience of description, a firmware module allocable with a slice of CPU time is also referred to as a "task" from the task management perspective.

New digital diagnostic features of optical transceivers require high processing power. This may be caused by the growing number of tasks performed as a result of increasing complexity of transceivers, or simply by frequent and/or fast execution of certain tasks to meet the new requirements of high refresh rate and/or low response time. There are several potential solutions to this problem.

Increasing the clock frequency of the CPU of the microcontroller may reduce or even eliminate the delay in task performance but would introduce problems in circuit operation. High operation frequency is associated with high power consumption and large electrical noise in the system circuit. Increased electrical noise will cause deterioration of the front ends of weak analog signals in the circuit and even violation to electromagnetic interference ("EMI") regulations set on communication equipment.

Alternatively, the delay in task scheduling could be reduced or eliminated by introducing a microcontroller with a high-performance CPU built in, or with dual cores, or even using an application-specific integrated circuit ("ASIC") with hardware peripherals dedicated to the transceiver functions of interest. However, a high-performance microcontroller would significantly increase component cost which is highly undesirable given the increasingly competitive optical transceiver market segment. Introducing an ASIC would have similarly undesirable affects since it would require a long development cycle and involve a high design cost.

Another possible solution to the problem is to improve the way execution of tasks is scheduled. There are several task scheduling algorithms commonly available, such as "round robin", "priority scheduling", "multiple priority queues", etc. Although these methods work well with generic applications, they are not optimized to meet the special requirements of an optical transceiver application. A scheduling method tailored to meet the specific needs by optical transceivers may potentially boost the net processing power and reduce various response time. The scheduling method may be embodied as a full standalone scheduling algorithm or a cooperative method to work with an existing scheduling algorithm. The latter embodiment can take the existing advantage offered by some scheduling algorithms.

Therefore, an optical transceiver capable of efficiently scheduling and executing all tasks without compromising transceiver performance or increasing component cost would be advantageous.

BRIEF SUMMARY OF THE INVENTION

These and other limitations are overcome by embodiments of the invention which relate to systems and methods for optimizing the task scheduling efficiency of firmware and/or software associated with optoelectronic transceiver devices.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

During the operation of an optical transceiver, multiple firmware operation tasks may contend for execution by CPU of microcontroller. Various operational tasks are performed based on operational parameters in order to optimize performance of the optical transceiver. High efficiency of scheduling tasks is performed by firmware in the optical transceiver according to teachings of the present invention.

In one example, an optical transceiver uses sensors to measure analog operational parameter signals such as temperature and supply voltage. A scheduling module executes scheduling microcode to generate the functionality that schedules tasks based on the operational parameters. The scheduling module compares operational parameters with their last known values and then flags necessary tasks to be initiated. The scheduling module flags only those tasks that rely on a particular operational parameter and only if the operational parameter has changed in value since the most recent time that it has been measured. Specifically, the scheduling module identifies leading tasks and dependent tasks and flags tasks only if data that relies on the operating parameter has changed since a previous task scheduling determination.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE SELECTED EMBODIMENTS

The principles of the present invention relate to an optical transceiver configured to perform efficient firmware task scheduling. During the operation of an optical transceiver, multiple firmware operation tasks may contend for execution by CPU of microcontroller. Various operational tasks are performed based on operational parameters in order to optimize performance of the optical transceiver. High efficiency of scheduling tasks is performed by firmware in the optical transceiver according to teachings of the present invention. An example operational optical transceiver environment will first be described. Then, the operation in accordance with the invention will be described with respect to the operational environment.

Figure 1:
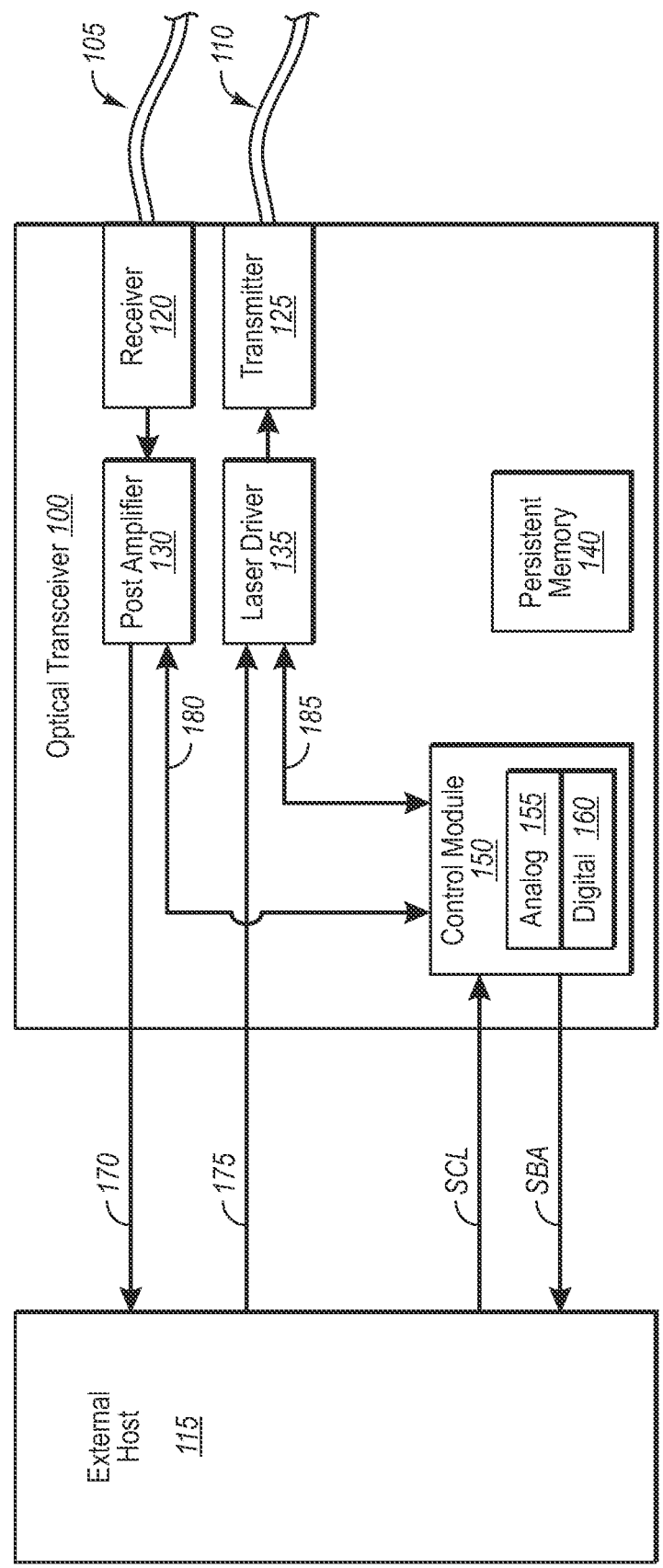
FIG. 1 schematically illustrates an example of an optical transceiver that may implement features of the present invention.

FIG. 1 illustrates an optical transceiver 100 in which the principles of the present invention may be employed. While the optical transceiver 100 will be described in some detail, the optical transceiver 100 is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100 receives an optical signal from fiber 105 using receiver 120. The receiver 120 acts as an opto-electric transducer by transforming the optical signal into an electrical signal. The receiver 120 provides the resulting electrical signal to a post-amplifier 130. The post-amplifier 130 amplifies the electrical signal and provides the amplified signal to an external host 115 as represented by arrow 170. The external host 115 may be any computing system capable of communicating with the optical transceiver 100.

The optical transceiver 100 may also receive electrical signals from the host 115 for transmission onto the fiber 110. Specifically, the laser driver 135 receives an electrical signal from host 115 as represented by the arrow 175, and drives the transmitter 125 (e.g., a laser or Light Emitting Diode (LED)) to emit optical signals onto the fiber 110, where optical signals are representative of the information in the electrical signal provided by the host 115. Accordingly, the transmitter 125 serves as an electro-optic transducer.

The behavior of the receiver 120, the post-amplifier 130, the laser driver 135, and the transmitter 125 may vary dynamically due to a number of factors. For example, temperature changes, power fluctuations, and feedback conditions may each affect the performance of these components. Accordingly, the optical transceiver 100 includes a control module 150, which may evaluate operating conditions, such as, but not limited to, temperature, voltage, and low frequency changes (such as receive power) from the post-amplifier 130 (as represented by arrow 180) and/or from the laser driver 135 (as represented by arrow 185). This allows the control module 150 to optimize the dynamically varying performance, and additionally detect when there is a loss of signal.

Specifically, the control module 150 may counteract these changes by adjusting settings on the post-amplifier 130 and/or the laser driver 135 as also represented by the arrows 180 and 185. These settings adjustments are quite intermittent since they are only made when operating conditions so warrant. The control module 150 includes both an analog portion 155 and a digital portion 160. Together, portions 155 and 160 allow the control module to implement logic digitally, while still largely interfacing with the rest of the optical transceiver 100 using analog signals. The control module 150 can communicate with host 115 using, for example, a two-wire I2C interface shown as the serial data (SDA) and serial clock (SCL) lines.

The control module 150 may have access to a persistent memory 140, which in one embodiment, is an Electrically Erasable and Programmable Read Only Memory (EEPROM). The persistent memory 140 and the control module 150 may be packaged together in the same package or in different packages without restriction. Persistent memory 140 may also be any other non-volatile memory source.

Figure 2:
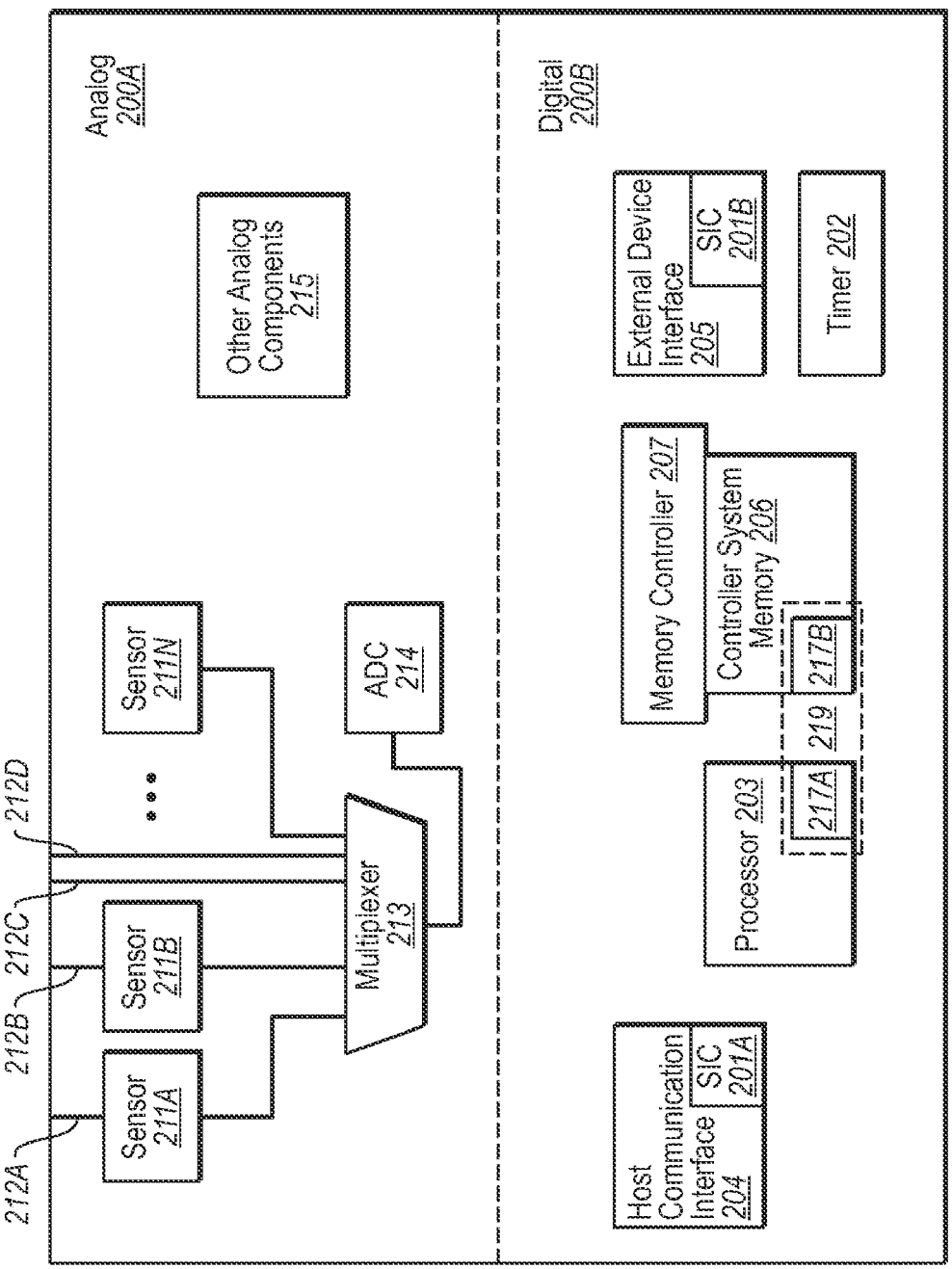
FIG. 2 schematically illustrates the control module of FIG. 1 in further detail.

FIG. 2 schematically illustrates an example of a control module 200 in further detail. The control module 200 includes an analog portion 200A that represents an example of the analog portion 155 of FIG. 1, and a digital portion 200B that represents an example of the digital portion 160 of FIG. 1. The analog portion 200A includes sensors 211A, 211B to 211N. The sensors can receive information on operational parameters internally of the control module 200 itself such as, for example, supply voltage and transceiver temperature. The sensors can also receive external analog or digital signals from other components of the optical transceiver that indicate other operational parameters such as, for example, laser bias current, transmit power, receive power, laser wavelength, laser temperature, and Thermo Electric Cooler (TEC) current. Two external lines 212A and 212B are illustrated for receiving such external analog signals although there could be many of such lines. The control module can also receive operational parameters from sensors located outside of the control module, which is represented by lines 212C and 212D.

The internal sensors may generate analog signals that represent the measured values. In addition, the externally provided signals 212A, 212B, 212C, 212D may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, all analog signals may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

The analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer. A general-purpose processor 203 is also included. The processors recognize instructions that follow a particular instruction set, and may perform normal general-purpose operation such as shifting, branching, adding, subtracting, multiplying, dividing, Boolean operations, comparison operations, and the like.

A host communications interface 204 is used to communicate with the host (depicted in FIG. 1 as lined SDA and SCL). Other host communication interfaces may be implemented. Control module 150 transmits data to the host 115 using host communications interface 204 to allow for digital diagnostics and readings of temperature levels, transmit/receiver power levels, and the like. The external device interface 205 is used to communicate with, for example, other external components of the optical transceiver 100 such as, for example, the post-amplifier 130, the laser driver 135, and/or the persistent memory 140.

The internal controller system memory 206 (not to be confused with the external persistent memory 140) may be Random Access Memory (RAM) or non-volatile memory. The memory controller 207 shares access to the controller system memory 206 with the processor 203, the host communication interface 204, and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as I2C or any other interface recognizable by both communicating modules. This enables the two serial interface controllers 201A and 201B to operate in a master/slave relationship, which configuration is known by those of skill in the art and will not be discussed in detail.

Having described a specific environment with respect to FIGS. 1 and 2, it will be understood that this specific environment is only one of countless hardware and software architectures in which the principles of the present invention may be employed. As previously stated, the principles of the present invention are not intended to be limited to any particular environment.

In accordance with the present invention, an optical transceiver performs monitoring and performance of optimization tasks based on digital operational parameters. As also shown in FIG. 2, the processor 203 has a scheduling component 217A that accesses scheduling microcode 217B stored on controller system memory 206. Together, scheduling component 217A and microcode 217B make up a scheduling module 219 which controls the scheduling features of the present invention.

Thus, an exemplary scheduling operation occurs as follows: The optical transceiver uses sensors 211A, 211B through 211N to measure analog operational parameter signals such as temperature and supply voltage. Scheduling component 217A executes scheduling microcode 217B to generate the functionality of scheduling module 219 that schedules tasks based on the operational parameters. The scheduling module 219 compares operational parameters with their last known values and then flags necessary tasks to be initiated. The scheduling module 219 flags only those tasks that rely on a particular operational parameter and only if the operational parameter has changed in value since the most recent time that it has been measured. Specifically, the scheduling module 219 identifies leading tasks and dependent tasks and flags tasks only if data that relies on the operating parameter has changed since a previous task scheduling determination.

Figure 3:
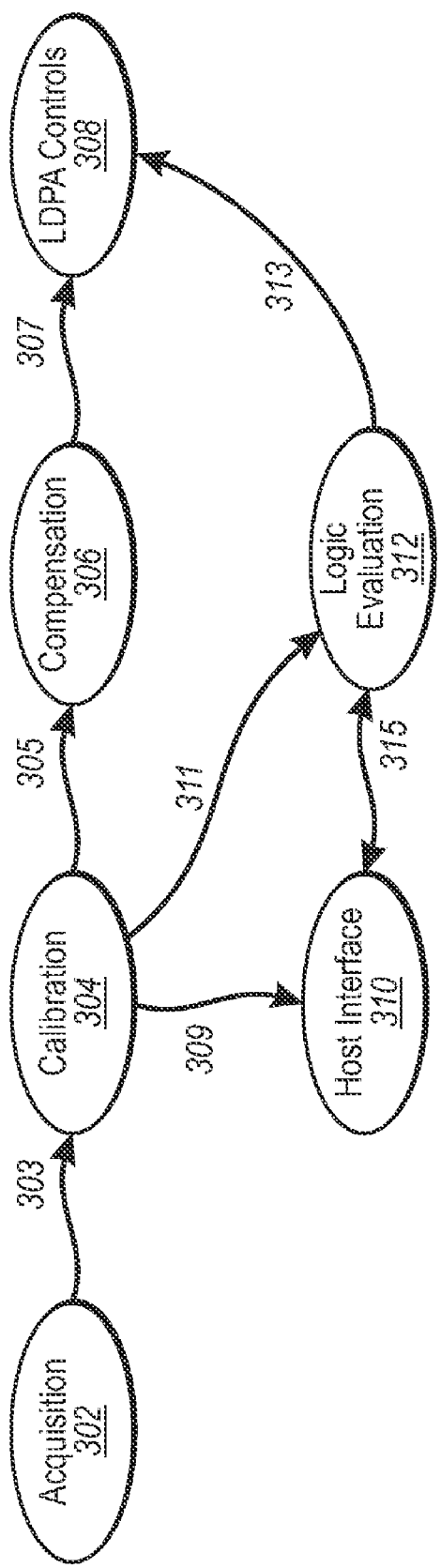
FIG. 3 diagrammatically illustrates the relationship between leading tasks and dependent tasks.

FIG. 3 illustrates pictorially task relationships in an exemplary optical transceiver upon identifying certain operating parameters. It will be appreciated that FIG. 3 is being used to describe dependencies of task relationships and that the present invention is not limited to the particular tasks depicted in FIG. 3.

FIG. 3 shows an acquisition task 302, which sequences and controls the sampling and quantization of multiple analog signals to operational parameters. The parameters may include but are not limited to temperatures, supply voltages, receiver optical powers, transmit optical powers and biases. Separate sets of supply voltage, optical power and bias parameters may be implemented in one physical transceiver 100 for optical signals in both analog (e.g. video) and digital form. The digital optical signals may be in continuous mode or burst mode, and separate sets may be adopted for burst-on condition and burst-off condition. The acquisition task may be flagged by a timer interrupt that is available at a control module 150, if a regular or periodic quantization process is desired. The task may also be flagged by an A/D conversion completion interrupt that may be available at some control module. This alternative takes full use of the ADC hardware and achieves maximum throughput. The two interrupts can even be combined, and optionally further mixed with other control methods to give multi-mode operation of the ADC hardware in order to achieve optimal use and performance.

Upon collection of a digitalized operational parameter followed by optional digital filtering, the acquisition task 302 will decide whether to flag the dependent task calibration 304 as shown by line 303. For example, if the operational parameter is a temperature reading, and the obtained temperature reading after possible filtering has not changed since the last temperature reading, it is unnecessary for acquisition task 302 to flag the calibration task 304 for follow-up. The calibration task 304, which aims to eliminate the measurement errors caused by components' tolerance and to transform the measurements into diagnostic parameters in units and ranges as required by an applicable MSA or by each customer, would yield the same result as the previous if flagged and executed. The futile execution would waste CPU time slice and thus be undesirable.

However, if the acquisition task 302 obtains a new temperature reading that has changed since the last temperature reading, the acquisition task 302 flags dependent calibration task 304 which, in turn, flags dependent compensation task 306 as shown by line 305. The compensation task 306 takes selected variable operational parameters as input factors, which may typically be, but are not limited to, calibrated temperature and supply voltage, and calculates desired target parameters using respective formulas and/or lookup tables stored in memory 205. For example, the target parameter may be a bias current that will be taken by LDPA control task 308 and eventually sets the laser driver 135 at an optimal bias condition. The target parameter may also be a Rx bias voltage that will eventually sets the avalanche photodiode (APD), if adopted by receiver 120 as the photodiode solution, at an optimal bias condition. The target parameters may be others not listed here but require certain compensations and are then used for dynamic control of transceiver 120 to achieve optimal performance over variable operational conditions.

Upon obtaining an updated target parameter, the compensation task 306 decides if and how to flag the succeeding LDPA control task 308 as shown by line 307, depending on certain optional design considerations. The compensation task 306 may opt not to flag until the change of the target parameter from its old value recorded previously is above a preset threshold in order to avoid frequent trivial changes of a parameter applied, such as laser bias current. In addition, if a sudden large change is not desired, the compensation task 306 may introduce the new value of the target parameter gradually instead of applying the final value directly with a one-time flagging of LDPA control task 308. Specifically, the compensation task 306 may increase or decrease the current target parameter toward its final value step by step, and flag LDPA control task 308 at each step to apply the little intermediate changes.

The LDPA control task 308 represents the final execution unit that controls the laser driver and post-amplifier (LDPA) circuit via appropriate digital buses and/or individual analog or digital signals. In this context, the LDPA circuit refers generally to all the circuits for controlling receiver 120 and transmitter 125, regardless of whether the optical signal being transceived is in analog or digital form, and of the number of optical signals. The LDPA circuit may be embodied as one or more integrated circuits (IC), or discrete components, or their combinations. The digital bus, which connects the LDPA with the external device interface 205, may be inter-IC (I2C), serial peripheral interface (SPI), or other public or proprietary bus. More than one bus type may be used if multiple heterogeneous ICs are implemented in a transceiver solution 100. Depending on the specific LDPA ICs in use, individual analog or digital signals may be needed to complement the control functions. For example, a TX_Disable digital signal for shutdown of laser output and an APD_Control analog signal for biasing APD voltage of receiver 120. In case of analog control, a digital-to-analog (DAC) is typically used, either in form of a standalone IC or an equivalent embedded into another IC.

As will be appreciated, if the temperature does not change, execution of tasks 304, 306 and 308 does not occur, which makes processing resources available for other needed tasks based on other detected operating parameters.

FIG. 3 also depicts that one task may drive multiple dependent tasks. For example, upon obtaining a new calibrated temperature parameter, the calibration task 304 flags compensation task 306 as described above. In addition, other affected tasks like host interface task 310 and logic evaluation task 312 need be flagged. The host interface task 310 adapts and reports various internal parameters like calibrated temperature in a unique format requested by each customer or a standard format if a MSA is applied. These reported parameters include but are not limited to realtime digital diagnostic monitoring parameters, typically in 16-bit integer format, and alarm and warning flags in Boolean type. In case of multi-byte parameters, e.g. a 16-bit integer temperature, the host interface task 310 adapts them from one endian format to the other if the processor 203 in use adopts an endian format different from that of the applied host equipment. Thus, the host interface task 310 can also be flagged as necessary as shown by line 309.

The logic evaluation task 312, which evaluates various inputs and generates control parameters based on configurable logic combination, need to be flagged because, upon changed, variable parameter like temperature may be crossing alarm and/or warning thresholds and affect the logic evaluation results. The logic control parameter may be TX_OFF for turning off of laser, or TX_FAULT for eventually reporting a fault condition of transceiver 100 to the host 115, or other Boolean controls applied. The logic combination, which is specified explicitly in a software table, array or structure, or implicitly embedded in processor instructions stored in memory 206, is typically configured according to unique control logics requested by each customer in whole, or in part with a MSA applied. Thus, the logic evaluation task can be flagged as necessary as shown by line 311.

A task can also be multiply dependent on more than one preceding task. For example, in addition to being flagged by compensation task 306 as mentioned above, the LDPA control task 308 may also be flagged by logic evaluation task 312 as shown by line 313. The logic evaluation task 312 does so whenever the evaluation result of TX_OFF has changed and the laser control signal TX_Disable needs to be asserted or negated accordingly.

Furthermore, two tasks may drive each other, as shown by line 315. For example, the host interface task 310 may be required of a software TX_Disable_Soft control bit that, upon asserted, shall cause the logic evaluation task 312 to assert TX_OFF output. Meanwhile, whenever the logic evaluation task 312 asserts or negates TX_OFF for any reason, the logic evaluation task needs to reflect this laser status as a software status bit if requested by MSA.

FIG. 3 also illustrates leading tasks versus dependent tasks. Leading tasks generate data that is used by a dependent task. In the example of FIG. 3, there is a foremost leading task 302, which initiates flagging of dependent tasks. However, a dependent task can also be a leading task, if it is responsible for generating information to other dependent tasks. Thus, the flagging of a foremost leading task and dependent task(s) is performed in a cascade fashion based on whether the foremost leading task generates data based on identifying a change in an operating parameter. It will also be appreciated that a task may be dependent on different tasks that require identification of different operating parameters. So, where a first leading task might not flag a dependent task since there was no change in the operating parameter upon which that first task was dependent, a second leading task may very well flag that dependent task upon identification of a change in a different operating parameter on which the second leading task relied.

Figure 4:
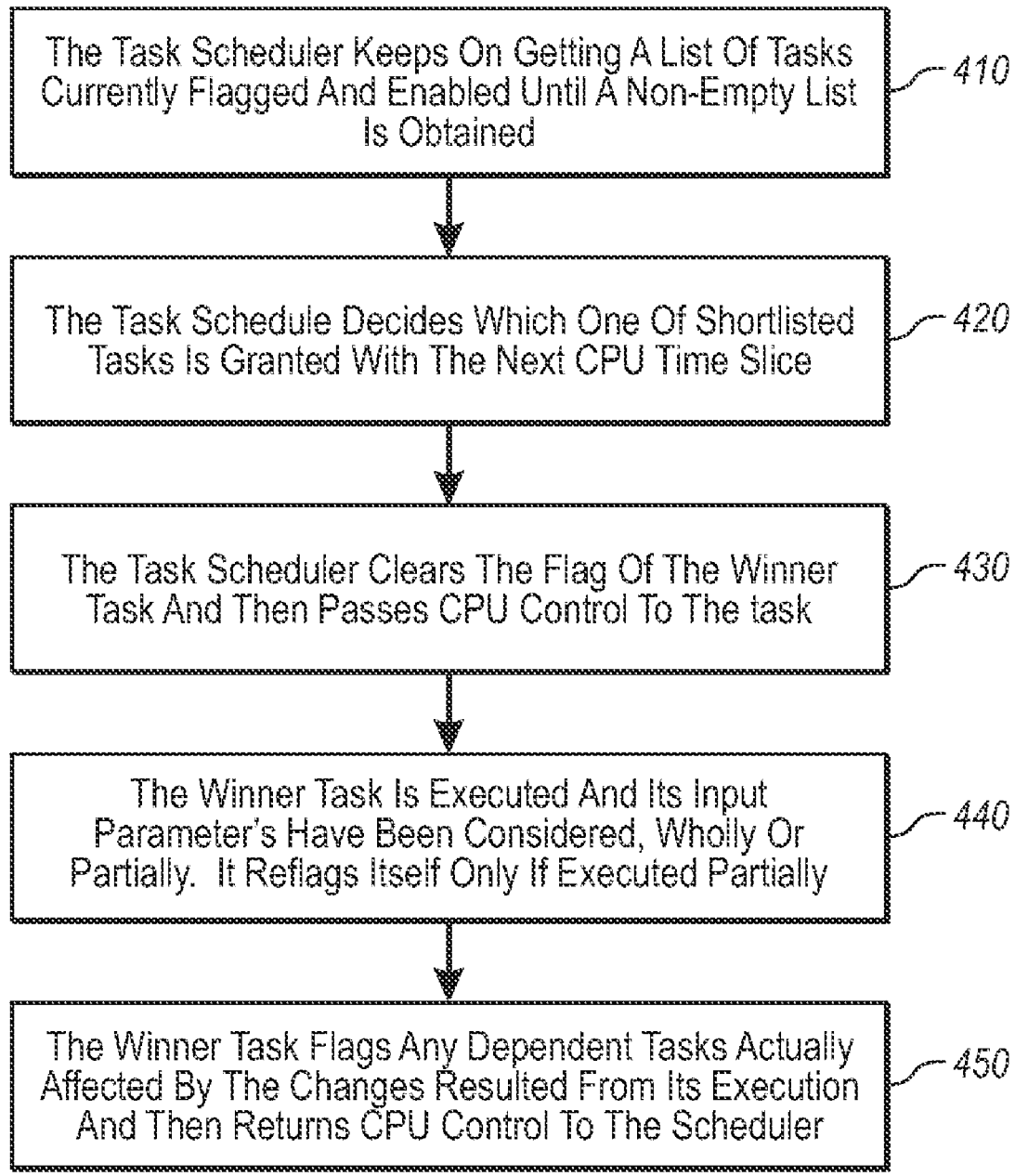
FIG. 4 illustrates a flowchart of an example of a method for scheduling tasks according to teachings of the present invention.

FIG. 4 is a flowchart of a method 400 for a control module in a device, such as an optical transceiver, to perform task scheduling based on operational parameters such that only necessary tasks are initiated. It is noted that each task has an associated flag of Boolean type or equivalent. Depending on specific firmware design, the flags of all tasks may either be implemented individually as separate variables or be grouped into one integer variable with one bit representing a flag. Additionally, each task may have an enable control of Boolean type or equivalent. A false state of the enable control prevents the associated task from being executed. This provides a flexible means to all tasks and the task scheduler itself to manipulate the execution of any task. It may also be used by a developer for firmware debug or by test and manufacture for flexible process control. Again, all these enables may either be implemented individually as separate variables or be grouped into one integer variable with one bit representing an enable control.

As shown as act 410, the task scheduler shortlists tasks by taking a list of tasks currently flagged and removing all tasks not enabled from the list. If the flags and the enables are grouped and implemented as integer variables as mentioned above, this procedure is greatly simplified to bitwise-ly "AND" the two integer variables and the set bits of resulted integer will give the shortlisted tasks. The obtained shortlist identifies all tasks contending for the next CPU time slice. If the list is found empty, task scheduler may opt to have CPU enter idle mode to reduce power consumption without worry of delay of execution of any task. In this case, there will be a mechanism to have CPU resume to normal mode and do the shortlist again. Alternatively, the task scheduler may simply do the shortlist immediately again.

If a non-empty shortlist has been obtained, the task scheduler will arbitrate which one shall be granted with the next CPU time slice using a scheduling algorithm (act 420). There are quite a few widely-used scheduling algorithms and their variants with different management overhead and subject to problems like "task starving". For example, "round robin", "priority scheduling", "multiple priority queues" are commonly used and their pros-and-cons can be found publicly. The shortlist method depicted here places no restrictions on which scheduling algorithm to use. In practice, the shortlist method is verified working well with priority scheduling.

Upon a winner task being identified, its associated flag will be reset and then the task scheduler passes CPU control to the task (act 430). The flag must be reset before the winner task starts processing any input parameters. Otherwise, there would be a race condition that new parameters are fed in and the flag is set by an interrupt or another task thread applied, just after parameter fetches by this winner task but before the flag reset. In this case, the winner task fed with new unprocessed parameters would not be flagged for contending next CPU time slice. The flag can be typically reset by task scheduler for simplicity. Alternatively, the reset operation may be left to individual task associated with the flag, if necessary with other considerations. The pass of CPU control to a task is typically implemented using a function call instruction or equivalent.

After obtaining the CPU control, the winner task executes its specific process with input parameters being handled (act 440). The specific process of each task has been described above with regard to FIG. 3. If a task has handled all input parameters and generated all final output parameters completely, it simply returns CPU control to task scheduler. If the workload cannot be finished within a desired period as determined by application design, a task may opt to continue until finish if deadline is not a concern by the application, or quit CPU control prematurely. In the case where a task quits prematurely without all input parameters been handled, the task reflags itself so that it can contend for next CPU time slice. With this cooperative task design, an urgent task with new input parameters fed in during the execution of another task can be granted CPU control in a short time. The duration from when new parameters are fed in to when they are handled by a task is referred hereinafter as "response time". Unlike a preemptive task scheduling which is also capable of short response time, this method does not require storage and restoration of the task context. The task context, also called "switch frame", includes the state of shared registers of a CPU and stack containing caller addresses and automatic variables, and need to be allocated for each task. Each time the task scheduler switches tasks, it has to spend CPU time on storing the context for the current task to be switched out and restoring the context for the next task to be switched in. The overhead associated with the preemptive scheduler or alike in terms of memory size and CPU time is high for transceiver firmware application where budget is usually limited. With the cooperative task design proposed here, short response time can be achieved without such overheads.

When a task has handled input parameters and finished its specific evaluations, its output parameters may be changed as a result. If the changed output parameters are input parameters to any dependent tasks, the running task shall flag all affected tasks before returning CPU control to task scheduler (act 450).

Figure 5:
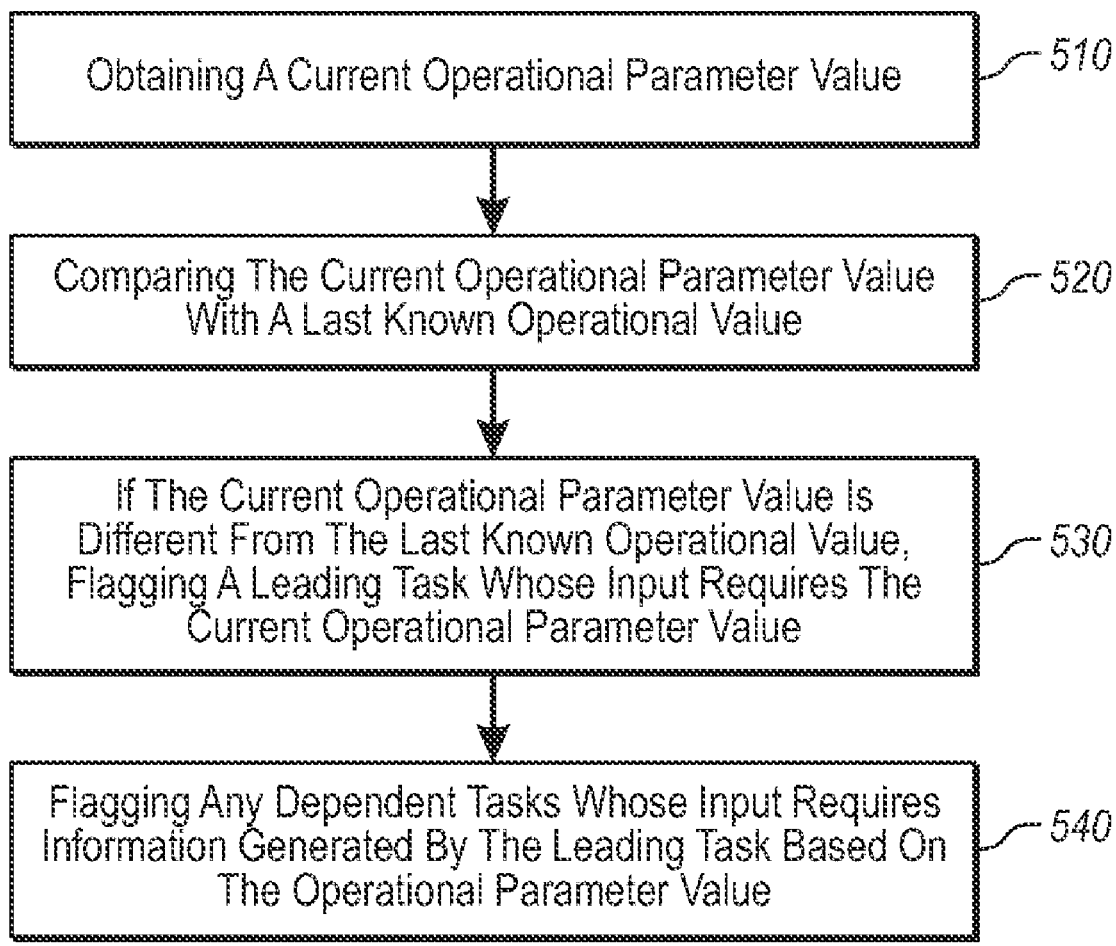
FIG. 5 illustrates another flowchart of an example of a method for flagging dependent tasks based on a leading task according to teachings of the present invention.

FIG. 5 illustrates the process of a leading task to flag a dependent task in further detail. It will be that flagging of a dependent task can occur before or during a task scheduling process so long as dependencies between tasks can be identified. The control module obtains a current value of an operational parameter via internal or external sensors (act 510). For example, the internal or external sensor may be an analog sensor which converts the received analog signal into a digital signal. The control module compares the current operational parameter value with a last known operational value (act 520). This can include comparing the operational value in its analog form or in its digital form. If a change in the operational parameter value has occurred, the control module flags one or more foremost leading tasks whose input requires the operational parameter value (act 530). A leading task then flags any dependent tasks that require information generated by the leading task based on the operational parameter (act 540).

An embodiment of the method of FIGS. 4 and 5 will now be described with reference to the environment described and illustrated with respect to FIGS. 1 and 2. Referring to FIG. 1, transceiver 100 is shown as being communicatively couplable to host 115. In this description and in the claims, two entities are "communicatively couplable" if they are capable of being communicatively coupled with each other. In this description and in the claims, "communicatively coupled" is defined as being capable of communicating data either one way or bi-directionally.

Referring to FIG. 2, control module 200 contains a number of different components for obtaining operational parameter measurements, comparing and identifying changes in operational parameters and also performing flagging and executing operations. For example, sensors 211A, 211B through 211N are provided for obtaining internal and/or external operating parameters such as transceiver temperature, supply voltage, laser bias current, transmit power, receive power, and the like. The scheduling component 217A of the processor 203 executes scheduling microcode 217B stored on the memory 206 (the combination of 217A and 217B being referred to as the scheduling module 219). The scheduling module 219 compares the current operational value received with the last known value of that particular operational parameter. If the value of an operational parameter has changed, then the scheduling module 219 flags any leading tasks and/or dependent tasks for execution. The scheduling module 219 then initiates execution of the flagged tasks.

By scheduling tasks in the above-described manner, the present invention eliminates the need to futilely execute unnecessary tasks, which provides, among other things, the following advantages:

The optimized scheduling of the present invention can be performed on any arbitrary number of tasks and/or dependent tasks. This provides firmware designers with great flexibility. Naturally, the device upon which the invention is operating will experience greater efficiencies as the number of potential tasks increases.

The overhead in terms of additional RAM can be minimized because each task needs only one additional bit. A typical application like transceiver firmware can be handled well within 16 tasks, which take only two-byte of RAM. This also provides firmware designers with flexibility in terms of decreasing overhead concerns.

The invention can be used in combination with various scheduling algorithms. With its shortlisting feature, the present invention can enhance priority-based task scheduling algorithms, although the invention is not limited to these types of scheduling algorithms. This also allows firmware designers flexibility in being able to use their preferred scheduling algorithm.

As can be appreciated by those of skill in the art, reducing component costs is a a critical factor to the marketing success of transceivers, particularly in products where the profit margin is extremely sensitive to component costs, such as Passive Optical Networking (PONs) applications that are based on Fiber to the Home (FTTH) technology. By improving efficiency of available processing power, the present invention allows even low MIPS (million instruction per second) microcontrollers to be used to handle complex PON applications with relatively heavy workloads, while being extremely cost-effective.

Another manufacturing consideration that is gaining more importance in the industry is the effect on energy resources and when the present invention is combined with the other operational functionalities of a transceiver, the CPU can be controlled running at a lower clock frequency, which reduces power consumption.

Besides increasing overall timing performance, an added advantage of the present invention is that it increases the operational safety of transceivers. That is, efficient task scheduling can achieve a high performance microcontroller a fast response to urgent tasks, such as eye-safety control.

Embodiments included general-purpose and/or special-purpose devices or systems that include both hardware and/or software components. Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in the systems of the present invention, the computer program product having a physical computer-readable medium having computer readable program code stored thereon, the computer readable program code comprising computer executable instructions that, when executed by a processor, cause the system to perform the methods of the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In an optical transceiver that is communicatively couplable to a host computing system, the optical transceiver including a system memory, and at least one processor, a method for performing task scheduling in the optical transceiver such that only effectual tasks are performed, the method comprising:
    an act of identifying a list of flagged tasks;
    an act of identifying which of the flagged tasks are enabled;
    an act of removing the flagged tasks that are not enabled from the list;
    if the list still contains flagged tasks that are enabled, an act of arbitrating which flagged and enabled task will be granted a next available CPU time slice;
    an act of resetting a flag for the granted task;
    an act of passing CPU control to the granted task; and
    wherein the list of flagged tasks for the optical transceiver includes at least one of an acquisition task, a calibration task, a compensation task, a laser driver and post-amplifier control task, and a logic evaluation task.

2. The method as recited in claim 1, wherein the list of flagged tasks includes at least one of an acquisition task, a calibration task, a compensation task, a laser driver and post-amplifier control task, and a logic evaluation task.

3. The method as recited in claim 1, wherein the act of passing CPU control to the granted task uses a functional call instruction.

4. The method as recited in claim 1, further comprising, if the list does not contain flagged tasks that are enabled, an act of setting a CPU mode to idle.

5. The method as recited in claim 1, further comprising, if the list does not contain flagged tasks that are enabled, an act of repeating the act of identifying a list of flagged tasks.

6. The method as recited in claim 1, further comprising an act of flagging any dependent tasks whose input requires information generated by the granted task.

7. The method as recited in claim 1, further comprising, if the granted task is not wholly executed, an act of reflagging the granted task so that the granted task is available to contend for a next available CPU time slice.

8. The method as recited in claim 1, wherein a single flag may represent two or more tasks as a group.

9. In an optical transceiver that is communicatively couplable to a host computing system, the optical transceiver including a system memory, and at least one processor, a method for performing task scheduling in the optical transceiver such that only effectual tasks are performed, the method comprising the following:
    an act of identifying a first task to which CPU control is currently granted;
    if the first task cannot be completed by a predetermined deadline without all input parameters being handled, an act of receiving a selection by the first task to quit CPU control prematurely;
    an act of reflagging the first task so that the first task is available to contend for a next available CPU time slice; and
    an act of granting a second task in a shorter response time for CPU control than would be needed if storage of a context of the first task and restoring a context for the second task were required; and
    wherein the first task and the second task include at least one of an acquisition task, a calibration task, a compensation task, a laser driver and post-amplifier control task, and a logic evaluation task.

10. In an optical transceiver that is communicatively couplable to a host computing system, the optical transceiver including a system memory, and at least one processor, a method for performing task scheduling in the optical transceiver such that only effectual tasks are performed, the method comprising the following:
    an act of obtaining a current operational parameter value;
    an act of comparing the current operational parameter value with a last known operational value;
    if the current operational parameter value is different from the last known operational value, an act of flagging a leading task whose input requires the current operational parameter value;
    an act of flagging any dependent tasks whose input requires information generated by the leading task based on the operational parameter value;
    an act of executing the leading task and/or dependent task only if the leading task and/or dependent tasks are flagged;
    wherein the leading task and the dependent task include at least one of an acquisition task, a calibration task, a compensation task, a laser driver and post-amplifier control task, and a logic evaluation task.

11. The method as recited in claim 10, wherein a leading task may also be flagged by a timer interrupt.

12. The method as recited in claim 10, wherein a leading task may also be flagged by an analog to digital conversion completion interrupt.

13. The method as recited in claim 10, wherein the operational parameters include at least one of a supply voltage, a temperature, a laser bias current, a transmit power, a receive power, a laser wavelength, a laser temperature, and a Thermo Electric Cooler current.

14. The method as recited in claim 10, wherein the act of comparing the current operational parameter value with a last known operational value includes comparing the current operational parameter value in a digital form.

15. The method as recited in claim 10, wherein the act of comparing the current operational parameter value with a last known operational value includes comparing the current operational parameter value in an analog form.

* * * * *